AUTOMATIC TELEPHONE SYSTEM
Filed Sept. 26, 1956
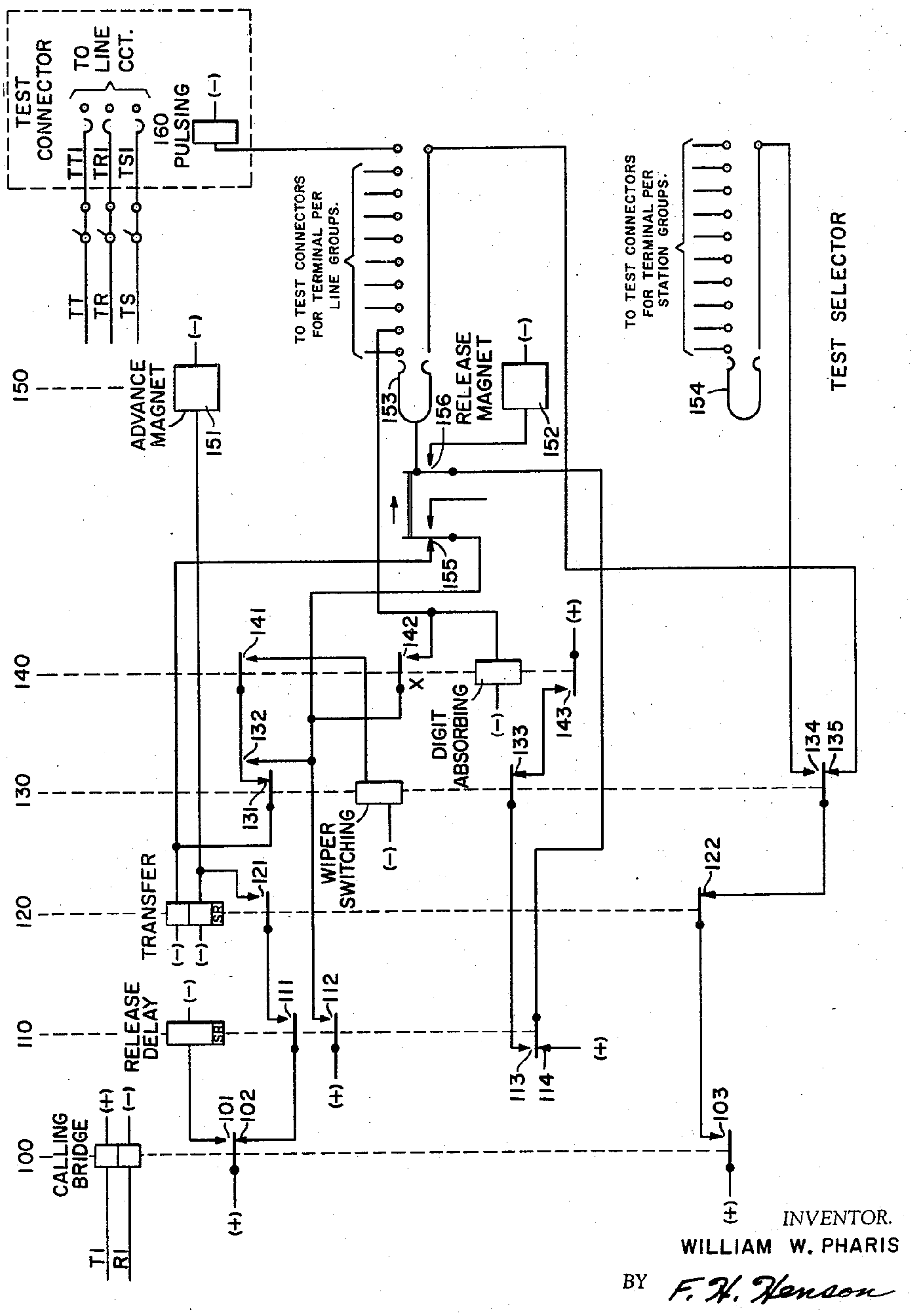
INVENTOR.
WILLIAM W. PHARIS
BY F. H. Henson
AGENT

United States Patent Office 2,854,520

Patented Sept. 30, 1958

2,854,520

AUTOMATIC TELEPHONE SYSTEM

William W. Pharis, Rochester, N. Y., assignor to General Dynamics Corporation, Rochester, N. Y., a corporation of Delaware Application September 26, 1956, Serial No. 612,174

5 Claims. (Cl. 179—18)

This invention relates in general to automatic telephone systems and more particularly to systems comprising single motion selector switches for performing certain of the selecting operations involved in establishing telephone connections.

In step-by-step telephone systems, the subscribers' lines are usually divided into one hundred line groups and, as dictated by traffic conditions, ten or more two-motion connector switches are usually provided to extend calls to each of the one hundred line groups. Two-motion selector switches are also provided for the purpose of selecting the groups of connectors and for then seizing an idle connector in the selected group. It is also conventional to provide a single two-motion test connector for each group of lines for the purpose of establishing busy verification or test connections to the lines of the group. In small offices of one thousand lines or less, a single motion ten point minor switch is provided in the test selector for the purpose of selecting the test connector serving the desired called line. In offices larger than one thousand lines, it is conventional to provide a two-motion test selector switch since more than ten test connectors are provided in the office. Because of the relatively great initial cost and mounting space requirements of a two-motion switch as compared to a minor switch, it is, of course, desirable to extend the selecting capabilities of a minor switch to a maximum degree.

Accordingly, it is the general object of this invention to provide a new and improved single motion selector switch for use in an automatic telephone system.

It is a more particular object of this invention to provide a new and improved single motion selector switch which is capable of selecting more succeeding circuits than has heretofore been possible.

The selector switch which forms the subject matter of this invention is particularly adapted for use in the test selector of a telephone system having both terminal-per-station and terminal-per-line operation. Since terminal-per-line operation requires the dialing of a ringing selecting digit, an extra digit is added to the directory number of terminal-per-station lines for universal numbering purposes. The test selector is adapted to absorb the digit preceding the digit which selects a test connector on calls to terminal-per-station groups so that the wire chief or busy verification operator can dial the full directory number into the test train. The test selector is also adapted to absorb the last or ringing selecting digit on calls to terminal-per-line groups. A test selector for both terminal-per-station and terminal-per-line operation, and which incorporates the above features, is shown and described in my copending application Serial No. 580,039, filed April 23, 1956, and assigned to the same assignee as the present invention.

In accordance with the present invention, the individual control conductor of each terminal-per-line test connector is connected to an individual terminal in one bank of the single motion selector switch and the individual control conductor of each terminal-per-station test connector is connected to an individual terminal in a second bank of the switch. A predetermined terminal in the first bank is reserved for digit absorbing marking. If the switch is set to any position other than the one corresponding to the predetermined terminal on a first advancement, the corresponding terminal-per-line connector is seized over the wiper associated with the first bank of terminals. The line selecting digits are then repeated by the selector circuit to the individual control conductor of the seized test connector. If the switch is set to the position corresponding to the predetermined terminal on a first advancement, a digit absorbing relay within the selector operates to restore the switch to normal. When the switch is returned to normal, a wiper switching relay operates. When the switch is set to any position on a second advancement, a corresponding terminal-per-station connector is seized over the wiper associated with the second bank of contacts and over its individual control conductor. The seized test connector serving terminal-per-station lines is then controlled over that connection by the selector circuit to select the desired called line. Thus it can be seen, that a total of nine terminal-per-line and ten terminal-per-station test connectors can be individually selected by the use of a conventional ten point minor switch.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which shows a portion of a test selector and a fragmentary drawing of a test connector.

It will be noted that only the portion of the test selector concerned with the selecting operation has been shown in the drawing. It is to be understood that the illustrated circuit could form a part of the test selector described in my above-identified copending application and that details as to the operation of the automatic testing equipment associated with a test selector of this type may be found in said application.

In the illustrated embodiment of the invention, all terminal-per-station subscriber stations are assigned a directory number which includes the digit "2" preceding the hundreds, tens, and units digits of the number and, as previously stated, it is necessary to absorb this digit in the test selector. For this purpose, the winding of digit absorbing relay 140 is shown connected to the second terminal in the bank of terminals associated with wiper 153 of minor switch 150. All of the other terminals in this first bank of terminals terminate individual control conductors which extend to pulsing relays, such as pulsing relay 160, in test connectors serving terminal-per-line groups. The control conductors from test connectors serving terminal-per-station groups terminate on individual terminals in the bank of terminals associated with wiper 154 of minor switch 150.

The illustrated circuit is seized by the closure of a loop across tip and ring conductors T1 and R1, respectively. The loop can be closed at a wire chief position, a toll position used for busy verification, a subscriber station, or at any other desired location. When the loop is closed, calling bridge relay 100 operates over a circuit extending from ground through its upper winding, over the loop, and through its lower winding to battery. At its operated make contacts 101, relay 100 closes an obvious operating circuit for release delay relay 110. Transfer relay 120 now operates over a circuit extending from ground through operated make contacts 112 on relay 110, through break contacts 155 in the off-normal pile-up of switch 150 and through its upper winding to battery.

In accordance with the digital impulses of a first digit received over conductors T1 and R1, relay 100 releases and reoperates on each impulse, and at its break contacts 102, repeats the pulses to the advance magnet 151 of switch 150. The pulsing path extends from ground through break contacts 102, operated make contacts 111 on relay 110, operated make contacts 121 on relay 120, and through the winding of magnet 151 to battery. The ground pulses are also coupled to the lower winding of transfer relay 120 and serve to maintain this relay operated until the digit is completed. Relay 110 also remains operated during the pulsing of relay 100 because of its slow release characteristics. At the completion of the first digit, transfer relay 120 releases.

When relay 120 releases, a control circuit comprising ground through operated make contacts 103 of relay 100, is closed to the minor switch wiper 153 through break contacts 122 on relay 120 and through break contacts 135 on wiper switching relay 130. If the first digit dialed is any digit other than the digit "2," the corresponding test connector serving a terminal-per-line group is seized. For example, if the first digit dialed is "0," relay 160 operates from the ground appearing on wiper 153 and applied to the tenth bank terminal. The line selecting digits next received over conductors T1 and R1 are repeated at contacts 103 to pulsing relay 160 in the test connector and in accordance therewith, relay 160 serves to position wipers TT1, TR1 and TS1 to engage the desired called line. As shown in the above-identified copending application, contacts 103 are shunted at the completion of the units digit so that the ringing selecting digit is not repeated to pulsing relay 160. Testing of the selected line is now accomplished over the multipled conductors TT, TR, TS, and wipers TT1, TR1, TS1, as fully described in the above-identified application.

If the first digit dialed into the test selector is the digit "2," digit absorbing relay 140 operates at the completion of the digit from the previously described ground through operated contacts 103, break contacts 122 and 135, wiper 153, and the second contact in the upper bank of switch 150. At its preliminary make contacts 142, relay 140 closes a locking circuit to its winding from ground through operated make contacts 112 on relay 110. At its operated make contacts 143, relay 140 closes ground through break contacts 133 on unoperated relay 130, operated make contacts 113 on relay 110, operated make contacts 156 in the off-normal pile-up of switch 150, and through the release magnet 152 to battery to energize said magnet. When the minor switch 150 is restored to normal, off-normal contacts 156 open to deenergize magnet 152 and off-normal contacts 155 reclose to again complete the previously described operating circuit for the upper winding of transfer relay 120. This ground is also coupled through break contacts 131 on relay 130, operated make contacts 141 on relay 140, and through the winding of wiper switching relay 130 to battery. Relay 130 operates and at its make contacts 132 closes a locking circuit for its winding from ground through operated make contacts 112 on relay 110. At break contacts 133, relay 130 further opens the energizing circuit for release magnet 152 and at its contacts 134 and 135, relay 130 performs the wiper switching function which will be described more fully hereinafter.

The hundreds digit of the terminal-per-station line received over conductors T1 and R1 serves to pulse calling bridge relay 100 and to step advance magnet 151, all as previously described. At the completion of the digit, transfer relay 120 releases to complete a connection between operated make contacts 103 and wiper 154 on switch 150. The test connector corresponding to the setting of the minor switch is now seized over a circuit extending from ground on operated make contacts 103, through break contacts 122 on relay 120, operated make contacts 134 on wiper switching relay 130, and applied through wiper 154 to the bank terminal to which its individual control conductor is connected. The tens and units digits received over conductors T1 and R1 are, of course, repeated by contacts 103 to the test connector to set the wipers of said test connector. The tests of the selected line are then performed, as previously described.

When the calling party opens the loop, relay 100 releases and relay 110 releases to open the holding circuit for relays 130 and 140, if operated, at contacts 112. Also, at break contacts 114, relay 110 connects ground through make contacts 156 in the off-normal pile-up of the switch to release magnet 152. Thus, the switch and all the relays in the circuit are restored to normal.

While there has been shown and described what is at present considered to be the preferred embodiment of the invention, modifications thereto will readily occur to those skilled in the art and it is, therefore, intendetd to cover in the appended claims all such modifications as fall within the true spiirt and scope of the invention.

What is claimed is:

1. In a telephone system, a selector comprising a single motion selecting switch, a first group of connectors, a second group of connectors, a plurality of conductors extending from said selector and connected in multiple to each of said connectors, a first wiper associated with said switch, an individual control conductor for each connector of said first group accessible to said first wiper, a second wiper associated with said switch, an individual control conductor for each connector of said second group accessible to said second wiper, means for advancing said wipers, means responsive to a predetermined first advancement of said wipers for seizing the corresponding one of said connectors of said first group over said first wiper, means responsive to a different predetermined first advancement of said wipers for restoring said switch to normal, and means responsive to a second advancement of said wipers for seizing the corresponding one of the connectors of said second group over said second wiper, and means in said selector for controlling the seized connector over its control conductor to establish a connection between said multiply connected conductors and a called line.

2. In a telephone system, a selector, a first group of connectors, a second group of connectors, a plurality of conductors extending from said selector and connected in multiple to each of said connectors, an individual control conductor connected to each of said connectors, a selecting switch in said selector having a normal position and a plurality of stepped positions, said switch having first and second banks of terminals corresponding to said plurality of stepped positions and first and second wipers adapted to engage successive terminals in said first and second banks of terminals respectively, means for individually connecting the control conductors of said first group of connectors to any one other than a particular one of the terminals in said first bank of terminals, means for individually connecting the control conductors of said second group of connectors to the terminals in said second bank of terminals, means responsive to a first advancement of said switch to any one of said stepped positions other than the stepped position corresponding to said particular one terminal for seizing the corresponding one of said first group of connectors over said first wiper, means responsive to a first advancement of said switch to the stepped position corresponding to said particular one terminal for restoring said switch to normal, means responsive to a second advancement of said switch to any one of said stepped positions for seizing the corresponding one of said second group of connectors over said second wiper, and means in said selector for controlling the seized connector over its control conductor to establish a connection between said multiply connected conductors and a called line.

3. In a telephone system, a plurality of groups of lines of a first type, a plurality of groups of lines of a second type, a directively controllable connector associated with each group of lines for extending conections thereto, a selector, a plurality of conductors extending from said selector and connected in multiple to each of said connectors, an individual control conductor connected to each of said connectors, a selecting switch in said selector having first and second wipers, first and second banks of terminals associated with said first and second wipers respectively, means for connecting the individual control conductors of connectors associated with said first and second types of groups of lines to individual terminals in said first and second terminal banks respectively, means for advancing said wipers to engage selected ones of said terminals, means responsive to a predetermined first advancement of said wipers for seizing the corresponding one of said connectors accessible to said first wiper, means responsive to a different predetermined first advancement of said wipers for restoring said wipers to normal, means responsive to a second advancement of said wipers for seizing the corresponding one of said connectors accessible to said second wiper, and means in said selector for controlling the seized connector over its control conductor to establish a connection between said multiply connected conductors and the desired called line.

4. In a telephone system, a selector comprising a single motion selecting switch, a digit absorbing relay, a wiper switching relay, and control means, said switch having first and second wipers and first and second banks of terminals associated with said first and second wipers respectively, a first group of connectors, a second group of connectors, each of said connectors having an individual control conductor over which said connector is seized when said control means is connected thereto, means for individually connecting the control conductors of said first group of connectors to any one other than a particular one of the terminals in said first bank of terminals, said digit absorbing relay having an individual conductor over which said relay is operated when said control means is connected thereto, means for connecting the control conductor of said digit absorbing relay to said particular one terminal in said first bank of contacts, means for individually connecting the control conductors of said second group of connectors to any one of the terminals in said second bank of terminals, means for selectively advancing said switch to select a pair of terminals, means responsive to the termination of said advancement for connecting said control means to said first wiper to thereby seize the corresponding one of said first group of connectors or to operate said digit absorbing relay, means responsive to the operation of said digit absorbing relay for restoring said switch to normal, means responsive to the return of said switch to normal for operating said wiper switching relay, means for again selectively advancing said switch to select the same or a different pair of terminals, and means responsive to the termination of said second advancement and controlled by said wiper switching relay for connecting said control means to said second wiper to thereby seize the corresponding one of said second group of connectors.

5. In a telephone system, a selector comprising a single motion selecting switch and a digit absorbing relay, said switch having a normal position and a plurality of stepped positions, said switch also having first and second banks of terminals corresponding to said stepped positions and first and second wipers adapted to engage successive terminals in said first and second banks of terminals, respectively, a first group of circuits individually terminating on any one other than a particular one of the terminals in said first bank of terminals, means for connecting said digit absorbing relay to said particular one terminal in said first bank of terminals, a second group of circuits individually terminating on the terminals of said second bank of terminals, means responsive to a first advancement of said switch to any one of said stepped positions other than the stepped position corresponding to said particular one terminal for seizing the corresponding one of said first circuits over said first wiper, means responsive to a first advancement of said switch to the stepped position corresponding to said particular one terminal for operating said digit absorbing relay over said first wiper, means responsive to the operation of said digit absorbing relay for restoring said switch to its normal position, and means responsive to a second advancement of said switch to any one of its stepped positions for seizing the corresponding one of the circuits of said second group of circuits over said second wiper.

References Cited in the file of this patent

UNITED STATES PATENTS

| | | |
|---|---|---|
| 1,514,725 | Powell | Nov. 11, 1924 |
| 2,416,109 | Long | Feb. 18, 1947 |
| 2,617,887 | Taylor | Nov. 11, 1952 |